Oct. 28, 1952 A. C. BLANEY ET AL 2,615,990

MAGNETIC RECORDING AND REPRODUCTION

Filed June 18, 1949

INVENTORS
Arthur C. Blaney &
Dorothy L. Blaney
BY [signature]
ATTORNEY

UNITED STATES PATENT OFFICE 2,615,990

MAGNETIC RECORDING AND REPRODUCTION

Arthur C. Blaney and Dorothy L. Blaney, Los Angeles, Calif., assignors to Radio Corporation of America, a corporation of Delaware Application June 18, 1949, Serial No. 99,987

11 Claims. (Cl. 179—100.2)

This invention relates to the recording and reproduction of magnetic sound records, and particularly to a system for recording a new form of track and the magnetic head for forming the track.

There are many types of magnetic record mediums or carriers, such as wire, steel tape, and tape made of very small magnetic particles coated on various bases. One of the common commercial forms of magnetic record mediums now in use is the coated type. Recording on this type of medium is accomplished by a head which is formed of two laminated core sections, around which a winding is placed, the laminations being of appreciable width and in glue contact with one another. The core generally has one gap therein in the neighborhood of one mil in width, which is in contact with the magnetic tape or film during the recording process. A rear gap may also be provided of somewhat greater width.

With this type of recording head, the magnetic medium is longitudinally magnetized, so there will be, longitudinally of the track, alternate north and south poles, the distance between the poles depending upon the wavelength of the signal impressed upon the recording head. With this type of recording, the gap size and wavelength, particularly at high frequencies, combine to make a magnet which has an aspect ratio which is very unsuitable for permanent magnets. When a magnet is magnetized to saturation, and then subjected to open circuit conditions, the resultant magnetism or remanence is something less than the residual induction of the material. The amount which the magnet retains is dependent upon the frequency. At high frequencies, the wavelength of each magnet is so short that it has the property of de-magnetizing itself, and this property contributes substantially to the high frequency losses in magnetic recording.

It has been found that the most efficient magnetic design for a cylindrically shaped permanent magnet, is one in which the ratio of length-to-diameter is eight or more. Thus, if the most efficient series magnet for a particular design has an L/D less than eight, a larger field may be obtained by using parallel magnets having an L/D greater or equal to eight, where L is the length and D is the diameter. Thus, a given field may be obtained using parallel magnets with less magnetic material than by using a single series circuit.

Now, if a track is assumed to have a width of one-fourth of an inch and the wavelength of 9000 cycles is .002 of an inch at the customary motion picture speed of ninety feet per minute, it is apparent that with longitudinal recording, the width of a magnet one-fourth of an inch is very large compared with the length of .002 of an inch. This aspect ratio is unsuitable for a magnet.

The present invention, therefore, is directed to a construction of a magnetic head which lays down a series of multiple tracks, each one of which has a more suitable aspect ratio for a permanent magnet. This is accomplished by constructing the head of very thin magnetic laminations separated by non-magnetic spacers which are thicker than the magnetic laminations.

The principal object of the invention, therefore, is to facilitate the recording of magnetic records.

Another object of the invention is to provide an improved system for increasing the efficiency of recording a magnetic record of high frequencies.

A further object of the invention is to provide an improved recording head which has an improved aspect ratio for forming magnets in a magnetic recording medium.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
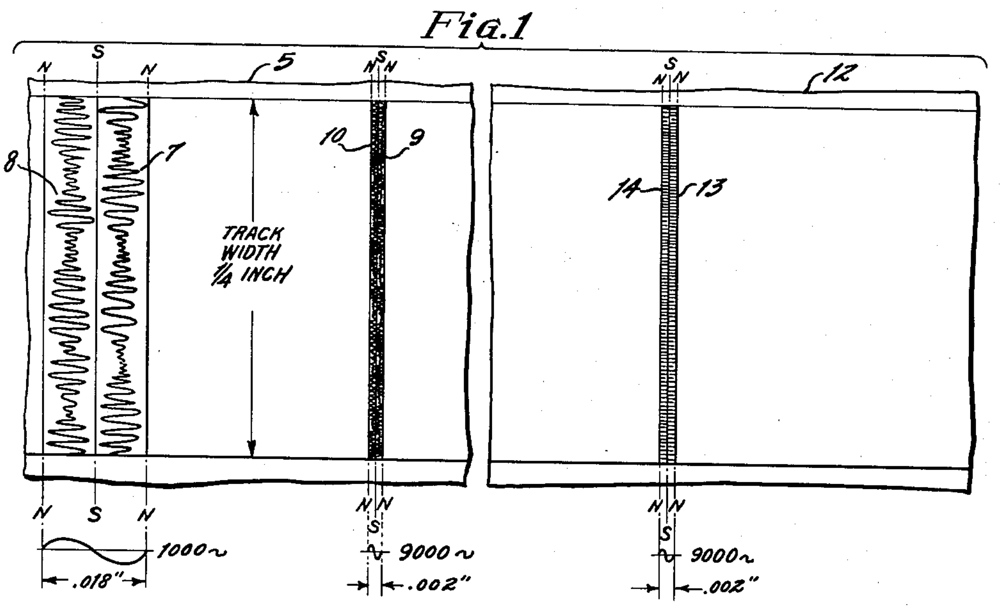
Fig. 1 is a partial view of a magnetic record illustrating the old and new forms of recording.

Referring now to the drawings, the left portion of Fig. 1 shows a section 5 of a magnetic track of the usual one-fourth of an inch in width. The distance between the north and south poles of a 1000 cycle tone is shown, when the film is driven at a normal motion picture speed of ninety feet per minute, as having a length of .009 of an inch, the total wavelength from one north pole to the next north pole being .018 of an inch to cover the entire cycle. The track illustrated by the wavy lines 7 and 8 is to show that the magnetism is continuous between the edges of the sound track. In the right-hand portion of section 5, is shown the relative distance between the north and south poles of a 9000 cycle wave, this distance being .001 of an inch, since the complete cycle length is .002 of an inch. As mentioned above, this length of magnet is so short that it has a property of demagnetizing itself, especially when it has a continuous magnetization, as shown by the wavy lines 9 and 10.

Figure 2:
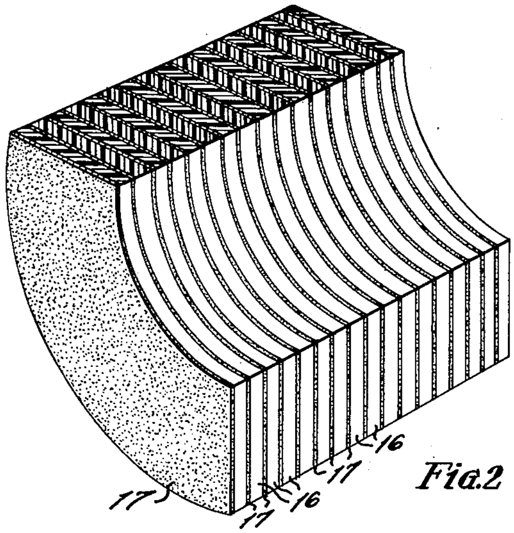
Fig. 2 is a partial, perspective view of a magnetic head constructed in accordance with the invention.
Figure 3:
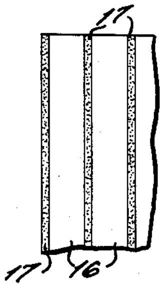
Fig. 3 is an end view of the head taken at one of the gaps thereof.
Figure 4:
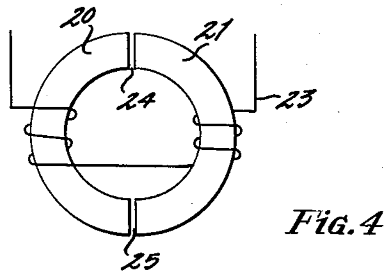
Fig. 4 is a diagrammatic view of the final form of the magnetic head embodying the invention.

Referring now to the right-hand section 12 of Fig. 1, the type of the track made with the new recording head is shown as a series of parallel magnetizations 13 and 14. The 9000 cycle frequency wave is the same length; namely, .002 of an inch. To produce this type of track, a head of the construction shown in Figs. 2, 3, and 4 is used.

Referring now to these figures, the dimensions of the magnetic laminations in the new head are determined from the formula that the ratio of length-to-diameter of the magnets produced in the record carrier should at least be eight, and substituting .002 of an inch for the length, the resulting diameter of the magnet is .00025 of an inch. A magnet having a diameter of .00025 of an inch has a cross-sectional area of $4.9\times10^{-8}$ square inches obtained from the formula $$A=\pi\frac{D^2}{4}$$

Assuming the average thickness of the magnetized portion of the coating is .0002 of an inch, then the width of the permanent magnet formed in the coating would be $4.9\times10^{-8}$, divided by .0002 or .000245 of an inch.

Now, to prevent de-magnetization between tracks, they should be separated, and to maintain the desired efficiency of the head, the spacing between tracks or laminations should be of the order of .001 of an inch. This will provide approximately 200 laminations and spacers for a head recording a track of one-fourth of an inch in width. In actual construction, the lamination is magnetic material coated on a non-magnetic spacer, which may be held together in any suitable manner.

In Figs. 2, 3, and 4, the spacers are shown at 16 and the magnetic core material intermediate the spacers is shown at 17. When the two core sections 20 and 21 are arranged as shown in Fig. 4 with the winding 23 and gaps 24 and 25 therein, the over-all appearance of the magnetic head is the same as present commercial types. However, the type of track laid down by the new head will be in accordance with the form shown at 13 and 14 in Fig. 1, which will more efficiently record high frequency currents, and thus, materially reduce the high frequency losses now present in magnetic recordings.

We claim:

1. A magnetic recording system, comprising a magnetic record medium and a magnetic head for magnetizing said medium in a plurality of parallel tracks extending longitudinally of said medium and spaced from one another transversely of said medium, each longitudinal section of said tracks transversely of said medium being magnetized substantially to the same extent by the same signal, said head including a plurality of magnetic laminations corresponding in number to said plurality of tracks and separated by non-magnetic spacers, and means for impressing a signal to be recorded on said laminations, the thickness of said spacers being greater than the thickness of said laminations.

2. A magnetic recording system in accordance with claim 1, in which the width of each spacer is of the order of .001 of an inch and the thickness of each lamination is of the order of .000245 of an inch.

3. A magnetic recording system in accordance with claim 2, in which the ratio of the width of said spacers to the width of said laminations being in the neighborhood of eight to one.

4. A magnetic recording system in accordance with claim 1, in which the width of each of said plurality of tracks is approximately .000245 of an inch, said tracks being separated approximately .001 of an inch.

5. A magnetic recording system in accordance with claim 1, in which approximately 200 tracks occupy a track width of one-fourth of an inch.

6. A magnetic recording head for simultaneously recording a plurality of separate magnetic tracks spaced transversely of a magnetic medium, each longitudinal section of said tracks having the same variations in magnetization, comprising a core section having at least one gap therein perpendicular to the direction of movement of said medium and windings on said core section, said core section including a plurality of magnetic laminations and intermediate non-magnetic spacers, said laminations being a coating of magnetic material on said non-magnetic spacers, the thickness of the spacers being greater than the thickness of said laminations.

7. A magnetic recording head in accordance with claim 6, in which said laminations are substantially .000245 of an inch thick and said spacers are substantially .001 of an inch thick.

8. A magnetic recording system whereby a plurality of separate parallel magnetic tracks spaced transversely of a record medium are adapted to carry the same signal in all tracks at any instant, comprising a magnetizable medium of a certain width, a magnet recording head having a gap therein in contact with said medium, the dimension of said gap transversely of said medium being perpendicular to the direction of movement of said medium, and means for obtaining relative movement between said medium and said gap, said head being composed of a plurality of magnetic laminations and intermediate non-magnetic spacers, said laminations being a coating of magnetic material on said non-magnetic spacers to form said tracks, the dimension of said gap parallel to the direction of movement of said medium being greater than the thickness of said coating of magnetic material.

9. A magnetic recording system in accordance with claim 8, in which said laminations are substantially .000245 of an inch thick and said spacers are substantially .001 of an inch thick.

10. A system for reducing the high frequency loss in recording magnetic sound records in a magnetic medium, comprising a magnetic medium, generating means for a signal to be recorded, recording means connected to said signal generating means for subjecting said medium to magnetic flux, said last mentioned means forming a plurality of varying length magnets within and longitudinally of said medium and spaced transversely thereof, the length of said magnets varying in accordance with the frequencies in said signal and the strength of said magnets varying in accordance with the amplitude of said signal, the width of said magnets formed by the highest frequency being recorded being less than the length of said magnets, and means for obtaining relative movement between said medium and said last mentioned means.

11. A system in accordance with claim 10, in which the relationship between the width of said magnets formed by a frequency of approximately 9000 cycles and the length of said magnets is in the neighborhood of one to eight.

ARTHUR C. BLANEY.
DOROTHY L. BLANEY.

REFERENCES CITED

The following references are of record in the file of this patent:

UNITED STATES PATENTS

| Number | Name | Date |
|---|---|---|
| 1,828,189 | Kiliani | Oct. 20, 1931 |
| 1,828,190 | Kiliani | Oct. 20, 1931 |
| 2,233,621 | Lovell | Mar. 4, 1941 |
| 2,263,485 | Clopton | Nov. 18, 1941 |
| 2,335,277 | Heller | Nov. 30, 1943 |
| 2,413,108 | Latchford | Dec. 24, 1946 |
| 2,466,514 | Vagtborg | Apr. 5, 1949 |